Dec. 19, 1950 W. FISCHER 2,534,256
TRAILER UNIT
Filed Aug. 3, 1945 5 Sheets-Sheet 1
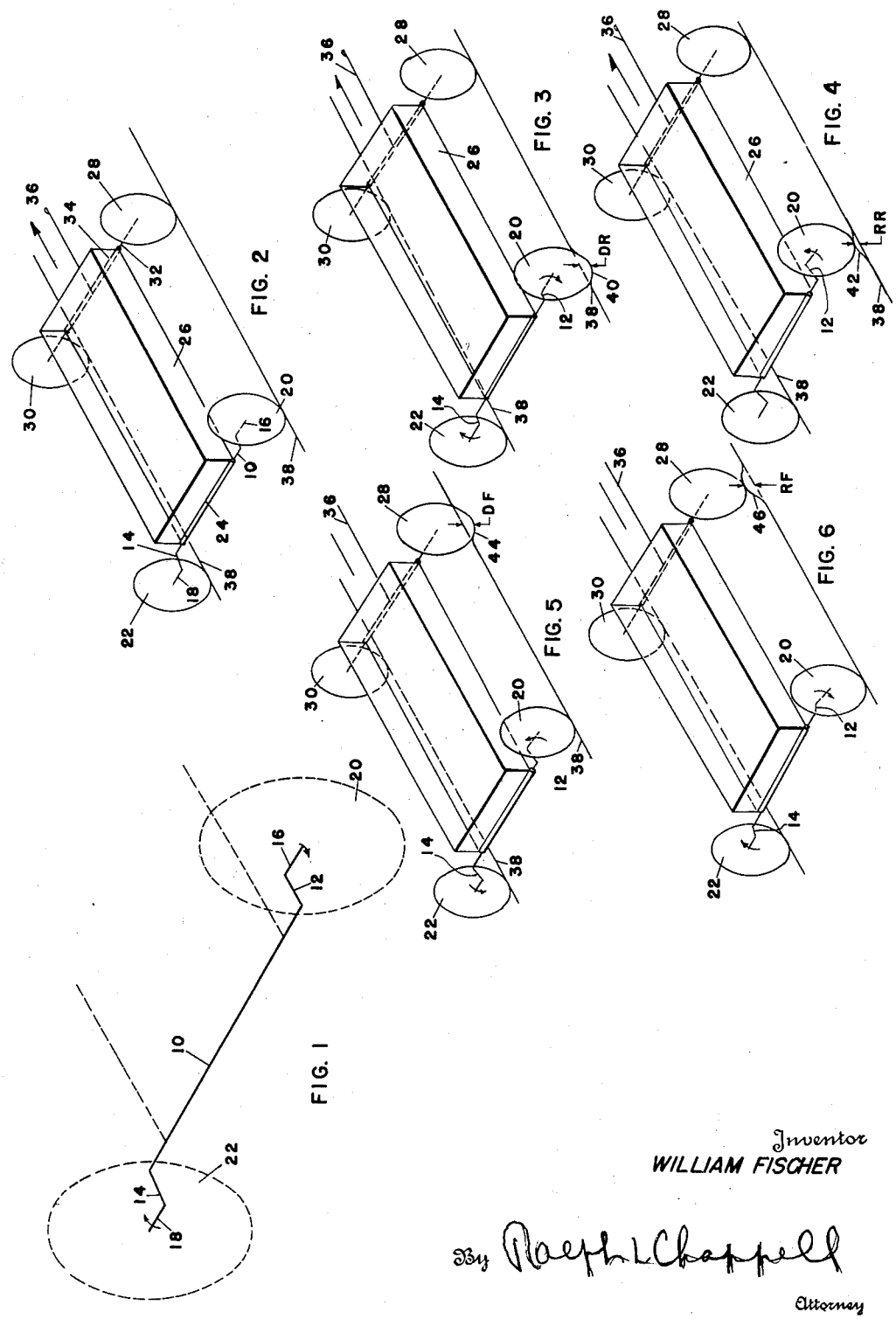
Inventor
WILLIAM FISCHER
By Ralph L Chappell
Attorney Dec. 19, 1950 W. FISCHER 2,534,256
TRAILER UNIT
Filed Aug. 3, 1945 5 Sheets-Sheet 2
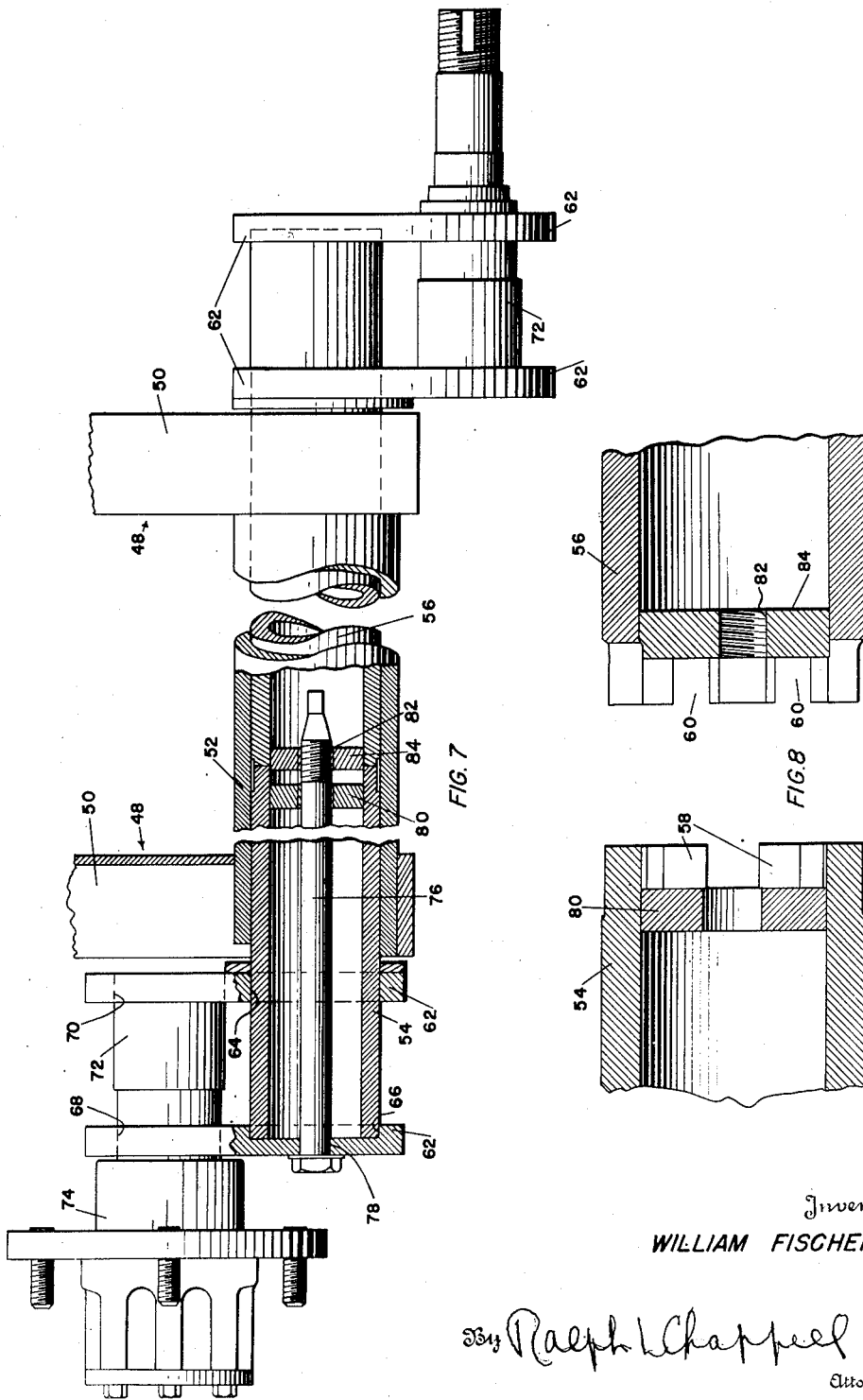
Inventor
WILLIAM FISCHER.
By Ralph L Chappell
Attorney Dec. 19, 1950   W. FISCHER   2,534,256
TRAILER UNIT Filed Aug. 3, 1945   5 Sheets-Sheet 3

Inventor
WILLIAM FISCHER.
By Ralph L Chappell
Attorney

Dec. 19, 1950 W. FISCHER 2,534,256
TRAILER UNIT
Filed Aug. 3, 1945 5 Sheets-Sheet 4
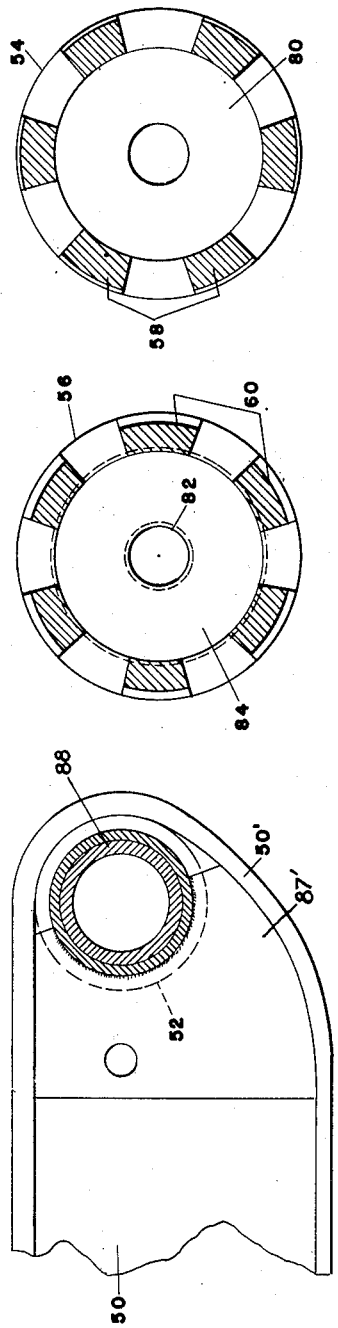
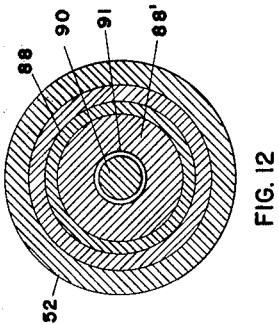
Inventor
WILLIAM FISCHER
By Ralph L. Chappell
Attorney

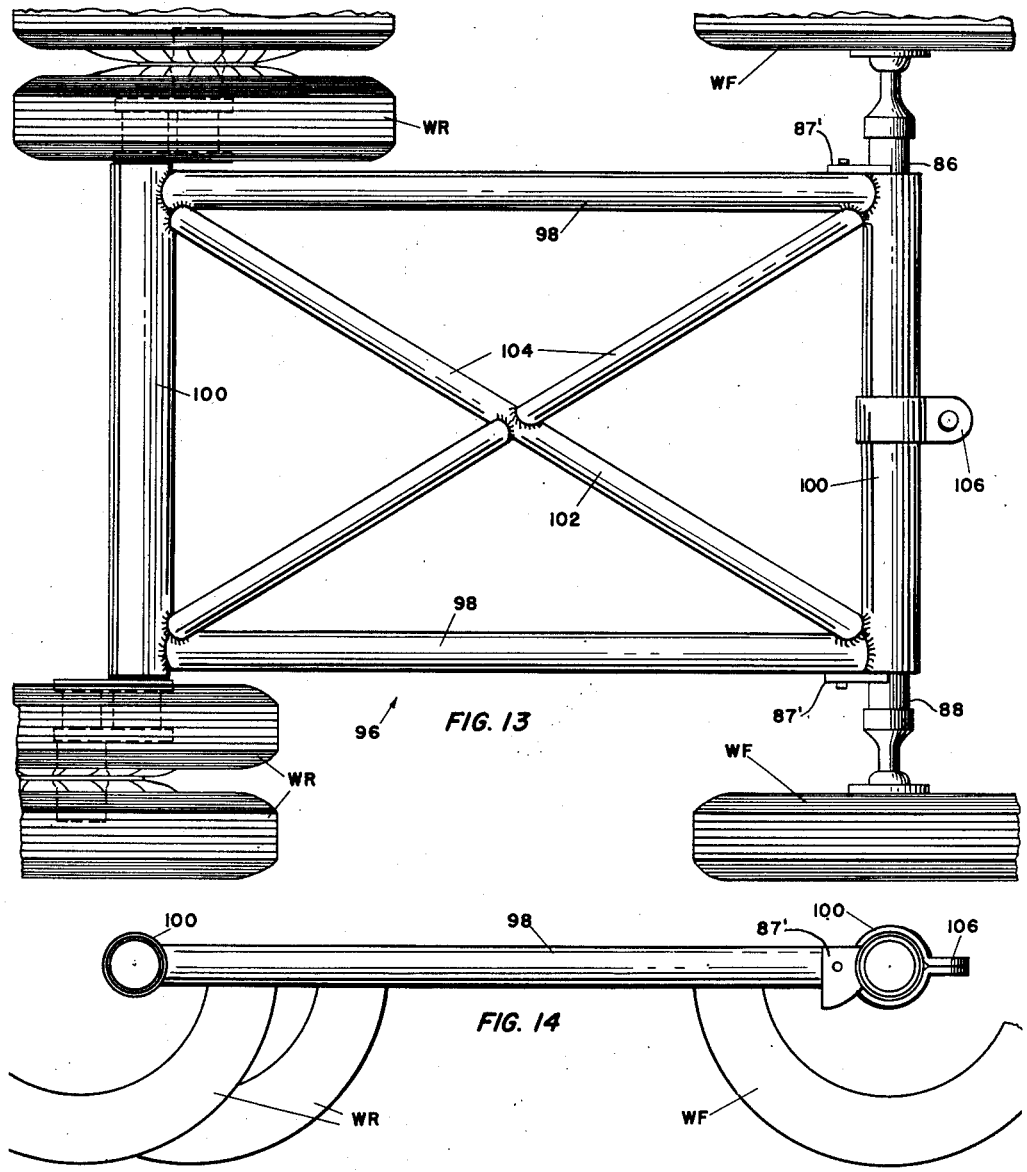

UNITED STATES PATENT OFFICE 2,534,256

TRAILER UNIT

William Fischer, United States Navy

Application August 3, 1945, Serial No. 608,799

10 Claims. (Cl. 280—80)

(Granted under the act of March 3, 1883, as amended April 30, 1928; 370 O. G. 757)

This invention relates to mobile attachments for supports and more particularly to an improved form of flexible wheel suspension units of the type adapted to be assembled with a support which will make such allowances for unevenness in the terrain over which the wheels pass that all of the wheels will remain in contact with the terrain at all times.

It is of prime importance that all the wheels of a vehicle contact the supporting surface at all times in order that undue load will not be imparted to one part of the vehicle or another thus setting up torsional strains in the body of the vehicle. This has been accomplished heretofore by providing flexible wheel suspension, for example, by employing springs between the axle or axle housing and frame whose deflection permits most of the wheel centers to comply with irregular supporting surfaces. Leaf springs, coil springs, torsion bar springs, and other less common types of springs may be used for this purpose. In addition other flexible means involving the deformation or compression of materials, such as rubber, fibrous elastic materials, etc., may be employed and even apparatus involving compressed air. One of the common means for providing flexible wheel suspension in vehicles not employing springs or compressible means is by pivoting one or more of the axles perpendicular to the axis on which the wheels rotate. This construction usually involves the front or steering axle and necessitates the use of radius rods or other braces.

It is an object of this invention to provide an improved wheel suspension unit for attachment to a vehicle or stationary equipment in order to convert it to a mobile state which may readily be assembled on the vehicle or stationary equipment, which will remain the wheels at all times in contact with the surface and which will eliminate the use of springs, yieldable members, transverse center pivots, radius rods and braces of the type referred to above.

With the foregoing in view, invention resides in the combination with a support of a shaft upon which one end of the support is journaled, crank arms extending diametrically opposite to each other at opposite ends of the shaft, an axle fixed to and extending laterally from the end of each crank arm and a wheel journaled on each of said axles, the shaft being free to turn so that the wheels will take whatever position is dictated by the character of the surface on which the wheels rest.

It is quite common to provide a frame or support for a Diesel electric unit, for example, which consists of standard beams rigidly joined to steady the unit on the ground, to prevent undue settling and to afford means to lift the unit on to a trailer.

It is a further object of the invention to provide in combination with such a support, mobile means which may readily be attached thereto to facilitate towing the support and unit without having to load it on to a trailer which would necessitate the use of tackle such as hoisting equipment. To this end another feature of the invention resides in mobile means for attachment to the support comprising a pair of shafts adapted to be attached to the support in a manner to permit free rotation thereof about their long axes. As illustrated herein, preferably the support is prepared for the attachment by having transverse hollow tubes as a part thereof into the opposite ends of which the shafts may be inserted, the shafts being fixed at their inner ends to each other by suitable fastening means, the fastening means preferably being such as to make the shafts rotate as a rigid unit. It is to be understood, however, that the hollow tubular members are not necessary but that the shafts may be adapted to be bolted for free rotation to the support at opposite sides thereof, and may rigidly be fixed together as heretofore related. It is to be further understood that each shaft as pointed out above has a crank extending laterally therefrom, the cranks being diametrally disposed and an axle fixed to its crank upon which there is journaled a wheel.

The mobile units which consist of axles, axle housings and wheels are heavy and difficult to handle by one man. Hence, it is a still further object of the invention to provide means for transporting the mobile units without loading them on to trucks. With this object in view, novelty also resides in the combination of mobile means and a light frame incapable of transporting a substantial weight, the mobile means comprising a pair of separable shafts having wheels attached to one end and means at their opposite ends by which the shafts may be joined end to end, and the frame comprising a substantially rectangular cross braced arrangement of structural members, the transverse structural members comprising hollow tubes adapted to receive in the opposite ends the shafts for securement thereon end to end so that by towing the frame and mobile means may readily be transported from place to place.

The invention will now be described in detail in its various aspects with reference to the accompanying drawings, in which:

Figs. 1 to 6, inclusive, are diagrammatic illustrations of the function of my improved wheel suspension;

Fig. 7 is a plan view of my improved wheel suspension partly in section;

Fig. 8 is a detail view showing interlocking means at the inner ends of the axles for securing them against torsional displacement;

Fig. 10 is a fragmentary portion of an end of the support adapted to receive my improved wheel suspension;

Fig. 11 shows cross sections of the inner ends of the rear axle units as seen in Fig. 8;

Fig. 12 is a cross-section of a front axle unit substantially on the line 12—12 of Fig. 9 with the structure assembled;

Fig. 13 is a plan view of an alternate light construction frame for receiving the front and rear axle units for transportation thereof; and Fig. 14 is a side elevation of the alternate light construction frame shown in Fig. 13.

Figure 9:
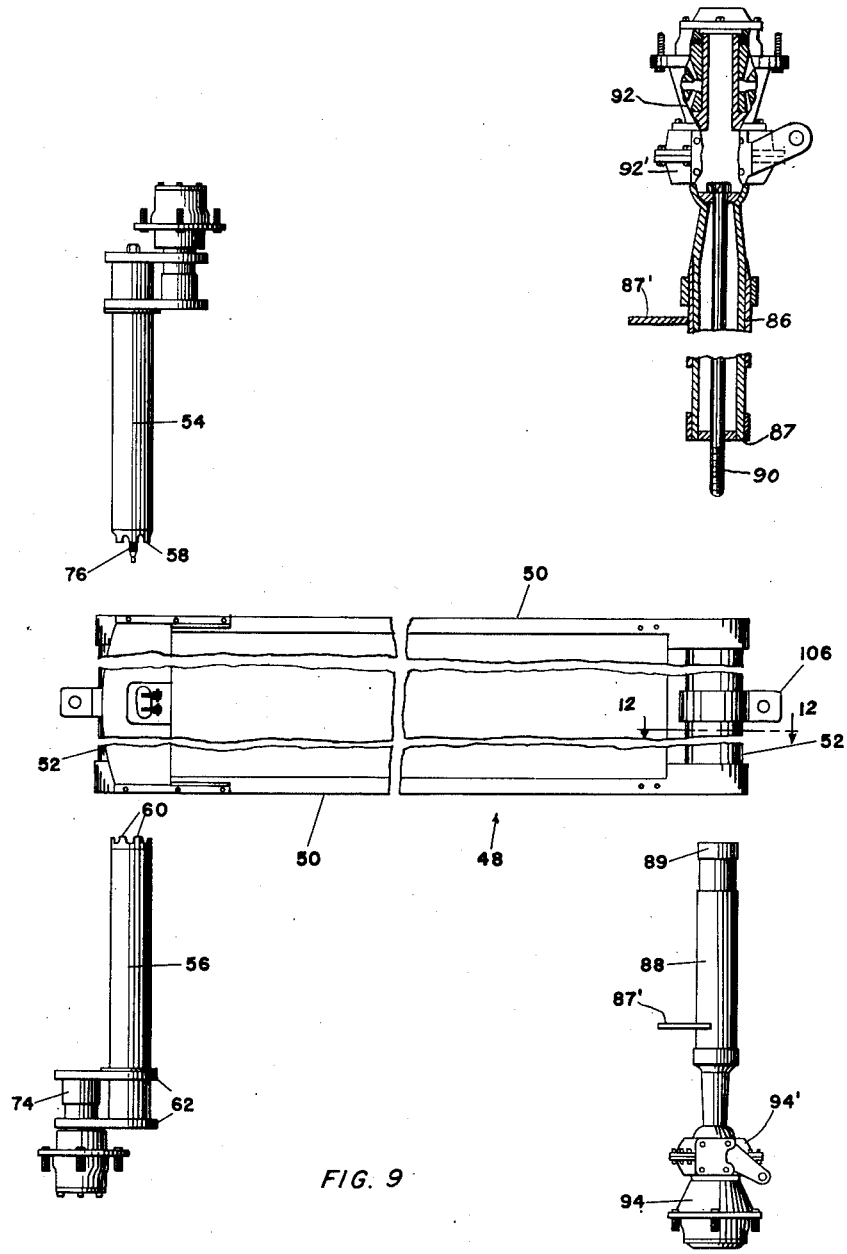
Fig. 9 is an exploded view in plan of the support, the rear wheel suspension unit and the front wheel suspension unit partly shown in enlarged section.

The invention relates to an improved form of wheel suspension. The principle of operation of my improved wheel suspension is diagrammatically illustrated in Figs. 1 to 6, inclusive. As shown therein the wheel suspension comprises essentially an axle 10, Fig. 1, having at opposite ends cranks or radial arms 12 and 14 extending at right angles to the axle and in opposite directions therefrom. The cranks have formed at their free ends laterally extending arms 16 and 18 adapted to receive for free rotation a pair of wheels 20 and 22. The aforesaid unit consisting of the axle 10 and wheels 20 and 22 is mounted at one end of a vehicle or frame 26, as shown in Fig. 2, the axle being journaled for free rotation in a tubular member 24 fixed to the rear end of the vehicle. With the aforesaid arrangement when the vehicle is on a level surface 38 the wheels 20 and 22 will occupy the same plane, that is, the surface engaging portions of each wheel will lie in the same plane but the centers of the wheels are offset from each other on opposite sides of the axle by an amount which is equal to the sum of the lengths of the cranks 12 and 14. For the purpose of illustrating the principle of operation only, the vehicle 26 is shown as furnished with front wheels 28 and 30 journaled on axle 32 of the usual form. This axle is in turn journaled in a tubular member 34 fixed to the front end of the vehicle. A tow member 36 is employed for fastening the vehicle for towing to a towing vehicle.

When a vehicle constructed in accordance with the foregoing description is towed over a surface 38 and a depression 40 is encountered, Fig. 3, into which the right rear wheel 20 falls there is a torsion force set up which tends to twist the frame 26. This torsion force, however, is compensated for by the rotation of the axle 10 in such a direction that the crank 12 moves in a clockwise direction. Since the axle 10 is a rigid unit the crank 14 also moves in a clockwise direction and as a result the rear end of the vehicle moves downwardly by an amount which is equal one-half of the depression "DR" into which the wheel 20 has fallen hence eliminating any difference in level between the opposite sides of the vehicle and avoiding setting up any torsion or twist in the frame. If, on the other hand, the right rear wheel 22 encounters a rise 42, Fig. 4, the wheel will rise and will cause the crank 12 to rotate in a counter clockwise direction. The rear end of the vehicle will thus be caused to rise by an amount which is equal to one-half of the rise "RR" upon which the wheel 20 rests. This again eliminates any difference in the level between the opposite sides of the vehicle. The compensating feature of the rear wheel suspension for uneven surface as described also takes care of any inequalities encountered by the front wheels without the necessity of modifying the customary wheel and axle construction. This is illustrated in Figs. 5 and 6. In Fig. 5 the front right wheel 28 is shown in a depression 44. When this occurs the tendency is for the whole right side of the vehicle to tilt downwardly. The change in the elevation which takes place in the vehicle when the right front wheel falls into a depression results in a lowering of the center of the front axle by an amount equal to one-half the depth of the depression, and a slight tilting of the vehicle toward the right. The center of the rear axle remains at the same elevation since its wheels still remain on the same elevation and since a straight line from one wheel center 16 to the other 16, Fig. 1, would pass through the axis of axle 10 at its center midway between the rear wheels. A very slight lowering of the center of the rear axle will result from this slight tilt which the rear wheels will assume, but this is negligible. As a result the right rear crank arm 12 is caused to rotate in a counter clockwise direction which in turn causes the left rear crank 14 to rotate in a counter clockwise direction. In Fig. 6 the right front wheel 28 is shown resting on a rise 46 and the rear wheels take care of this by a clockwise rotation of the cranks 12 and 14. The change in elevation which takes place when the right front wheel rests on a rise is a raising of the center of the front axle by an amount equal to one-half of the elevation of the rise and a slight tilting of the vehicle toward the left side. The center of the rear axle remains at the same elevation since its wheels still remain on the same elevation and since a straight line from one wheel center 16 to the opposite wheel center 16, as shown in Fig. 1, will pass through the axis of the axle 10 at its center midway between the rear wheels. A very slight lowering of the center of the rear axle 10 will result from the slight tilt which the rear wheels will assume, but this is negligible. It is evident from the description of the various conditions met with above that the wheel suspension construction described herein is capable of taking care of all situations met by a vehicle passing over an uneven surface.

A practical structural unit embodying the characteristics described is shown in Figs. 7 and 9 applied to a rectangular frame 48 which consists of a pair of parallel channel beams 50 rigidly joined at their opposite ends in spaced relation by a pair of transversely extending hollow bearing tubes 52, the latter being welded to the channel beams at their end portions. Referring to Fig. 11 the ends of the beams 50 are shown rounded at 50' to present a finished appearance.

In order that the rear axle suspension unit may readily be assembled and disassembled for use with any frame 48 such as heretofore described, the axle referred to schematically as 10 is divided up into two parts which comprise hollow tubular members 54 and 56. The tubular axle or shaft members 54 and 56 are of such dimension as to be telescopically fitted into the opposite ends of the bearing tube 52 and to be freely rotatable therein. Near the outer ends of the tubular shaft members 54 and 56 are mounted a pair of spaced parallel plates 62, one of the plates having an aperture 64 therein so that it may be slipped over the end of the tubular member and the other having a recess 66 therein so that it may be fitted on the end of the tubular member. These plates 62 are welded to their respective tubes and extend radially therefrom. The ends of the plates have openings 68 and 70 therein adapted to receive an axle 72, the axis of which is parallel to the axis of the tubes or shafts 54 and 56 and which extends laterally and outwardly from the plates 62. It is to be understood, however, that the specific construction set forth above for mounting the axle 72 is by no means the only practical construction but is by way of illustration only; other suitable means may be employed for mounting the axles in this off set relation. The axles 72 are provided with the usual hubs 74, the latter being adapted to receive wheels which may be bolted thereto. In order to maintain the tubes 54 and 56 as a rigid unit as was heretofore indicated, must be the case, the inner ends of these tubes as shown in Fig. 12 are provided with detents 58 and 60 adapted to interlock when the tubes are brought together end to end to prevent rotation of one tube with respect to the other. The tubes 54 and 56 are rigidly tied together in end to end relation after having been inserted into the opposite ends of the tube 52 by a bolt 76 passed through an opening 78 formed in one of the plates 62. The inner end of the bolt passes through an apertured plate 80 fixed in the inner end of the tube 54 which forms a bearing for the bolt and is threaded into a threaded opening 82 formed in a plate 84 fixed in the end of the tube 56. In Fig. 9 there is shown in an exploded position a frame 48 and rear and front axle units. As will be seen from this figure the rear axle unit consists of the tubes 54 and 56 having at their inner ends the interengaging portions 58 and 60, which, when brought together form a rigid connection. The front axle consists of the tubes 86 and 88 adapted to be telescopically inserted into the opposite ends of the tubular member 52 at the front of the vehicle. The tubes 86 and 88 may desirably each comprise inner and outer portions, as shown, pressed or otherwise secured together. As shown in Fig. 9, the inner ends 87 and 89 of these tubes have plain surfaces which are brought into alignment and held from the longitudinal movement with respect to each other by the combined effect of plates 87' integral with the tubes 86 and 88 and a threaded bolt 90 which is adapted to be threaded into opening 91 formed in a plate or disc 88' as shown in Fig. 12 fixed in one end 89 of the tubular member 88. The tubes are positively secured against turning by the plates 87' which are so shaped as to fit snugly into the inside of the channel flanges 50', as shown in Fig. 11. The tubular members 86 and 88 are provided at their outer ends with hubs 92 and 94 which are connected to the tubular members by steering knuckles 92' and 94'. The front wheels are bolted to the hubs.

The front and rear wheels assembled are heavy and difficult to handle and when not in use it is desired to provide some convenient means for transporting them without having to lift them into a truck or trailer and hence there is provided a light frame 96 shown in Fig. 13 with which these units may be assembled in the same manner as they would be assembled on the carrying frame 48 and transported by towing the frame 96. The frame 96 is constructed of light structural members not suitable for supporting a load consisting of spaced parallel tubular members 98 joined at their ends by transverse tubular members 100 and braced by cross members 102 and 104. The aforesaid tubular structural members are welded together but it is within the scope of the invention to use other fastening means and to use structural members of another shape such as I-beams. The wheels denoted by the reference characters WR and WF are shown assembled with the carrying frame in Figs. 13 and 14, the rear wheels being denoted by the character WR and the front wheels by the character WF. The plan view in Fig. 13 shows plainly the offset relation of the wheels W at the rear. The plates 87' are received on pins on the members 98, as seen in Figs. 13 and 14.

A towing member 106 is fastened to the front end of the frame 96 by which the frame may be attached for towing to a tow vehicle.

The apparatus described above is especially useful for transporting generator units which are used in field work which must of necessity be moved from one place to another and usually over extremely rough surfaces. These units are heavy and are disposed on a rigid frame adapted to rest on the ground, to support the units in a vertical position and to prevent them from settling into the ground by reason of their ground weight. If such a frame is made in a manner described and illustrated in Figs. 7 and 9 it is evident that the wheel suspension units as described heretofore may readily be attached to the frame by placing an ordinary building jack or jacks under the ends of the frame 48 and lifting it sufficiently to allow the axle assemblies to be inserted in the opposite ends of the transverse bearing tubes 52. It is evident that the only tools necessary are an end wrench of a size to fit the bolts 76 and 90 to insert them or remove them during assembling or disassembling operations, and one to fit a tongue connecting pivot bolt received in member 106. If the frame is not of this construction but consists merely of I-beams, the suspension units may be attached thereto by providing apertures in the webs of the beams and suitable bearing sleeves or providing plates which may be bolted to the I-beams, the plates having suitable apertures and bearing sleeves thereon.

When the axle assemblies are not in use it is desirable to assemble them on the towing frame 96, as shown in Figs. 13 and 14, in order to keep them out of the dirt and to provide immediate means for transporting them without loading them on to trucks or trailers.

The invention described herein may be manufactured and used by or for the Government of the United States of America for governmental purposes without the payment of any royalties thereon or therefor.

What I claim is:

1. Mobile means for attachment to a support, said means comprising a pair of hollow bearing members adapted to be secured to the opposite sides of the support, a pair of shafts adapted to be journaled in one of said hollow bearing members for free rotation about its longitudinal axis, means for rigidly fixing the adjacent ends of said shafts together for rotation as a unit, a crank fixed to and extending laterally from the opposite end of each shaft, said cranks being diametrally opposite, an axle fixed to and extending laterally from each crank arm and wheels journaled on each axle, a second pair of shafts adapted to be received in the other of said hollow bearing members with means for joining them together end to end, and wheels journaled at the outer ends of said second pair of shafts.

2. Mobile means for attachment to a support which is prepared for the attachment by having a transversely extending tubular member as an integral part thereof, said means comprising a pair of shafts adapted to be inserted into the opposite ends of said tubular member for free rotation about its longitudinal axis, means for rigidly fixing the adjacent ends of said shafts together for rotation as a unit, a crank fixed to and extending laterally from the opposite end of each shaft, said cranks being diametrally opposite, an axle fixed to and extending laterally from each crank and a wheel journaled on each axle.

3. Mobile means for attachment to a support which is prepared for the attachment by having a transversely extending tubular member as an integral part thereof, said means comprising a pair of shafts adapted to be inserted into the opposite ends of the tubular member for free rotation about its longitudinal axis, interengaging means at the inner ends of said shafts, means for drawing the ends of the shaft into engagement and locking the same to form a rigid member rotatable as a unit, a crank fixed to and extending radially from the opposite end of each shaft, said cranks being diametrally opposite, an axle fixed to and extending laterally from each crank and wheels journaled on each axle.

4. Mobile means for attachment to a support which is prepared for the attachment by having a transversely extending tubular member as an integral part thereof, said means comprising a pair of shafts adapted to be inserted into the opposite ends of the tubular member for free rotation about its longitudinal axis, interlocking fingers at the inner end of each shaft, a tie-rod extending along one of said shafts and adapted by threaded engagement with the other to hold the interengaging ends of the shafts together to constitute a rigid shaft rotatable as a unit, a crank fixed to and extending radially from the opposite end of each shaft, said cranks being diametrally opposite, an axle fixed to and extending laterally from each crank and wheels journaled on each axle.

5. Mobile means for attachment to a support which is prepared for the attachment by having a transversely extending tubular member as an integral part thereof, said means comprising a pair of tubular shafts adapted telescopically to be inserted into the opposite ends of said tubular member for free rotation about its longitudinal axis, interengaging means at the ends of said tubular shafts, means for tying said tubular shafts in rigid engagement end to end, radial arms fixed to the ends of each tubular shaft, a hub fixed to the free end of each radial arm with its axle parallel to the axis of the tubular shafts, and means for securing a wheel to each hub.

6. Mobile means for attachment to a support which is prepared for attachment by having transversely extending tubular members near each end of said support and forming integral parts thereof, said means comprising a pair of tubular shafts adapted to be telescopically inserted into the opposite ends of one of said tubular members near one end of said support for free rotation about their longitudinal axis, inter- engaging means at the ends of said tubular shafts, means for tying said tubular shafts in rigid aligned engagement end to end within said tubular member, radial arms fixed to the outer end of each tubular shaft, a hub fixed to the free end of each radial arm with its axle parallel to the axis of the tubular shafts, means for securing a wheel to each hub, a second pair of tubular shafts adapted to be telescopically inserted in the opposite ends of another of said tubular members near the other end of said support, means extending between said second mentioned tubular shafts for tying the shafts together within the tubular member, means carried on each of said second mentioned tubular shafts adapted to be secured to said support preventing rotation of said shafts within the tubular member, a steering means carried by each of said second mentioned tubular shafts, and wheel mounting hubs carried on the outer end of each of said second mentioned tubular shafts.

7. Mobile means for attachment to a support, comprising a pair of shafts adapted to be attached to the support in a manner to permit free rotation of the shafts as a unit about their longitudinal axis which is always perpendicular to the normal direction of travel of the support and perpendicular to the vertical axis of the support, means rigidly fixing said shafts together end to end for rotation as a unit extending across the width of the support, a crank fixed to and extending radially from the opposite end of each shaft, said cranks being diametrally opposite from each other, an axle fixed to and extending laterally from the end of each of said crank arms and parallel to said shaft axis, and wheels journaled on said axles and disposed at opposite sides of said support, said wheels being always parallel to the normal direction of travel of the support and parallel to the vertical axis of the support regardless of the angular displacement of the cranks on the shaft, said shafts being tubular, and said means fixing said tubular shafts together including tie bolt means disposed within said tubular shafts, a second pair of tubular shafts adapted to be attached to the support spaced from and parallel to said first pair of shafts, tie bolt means disposed within said second pair of tubular shafts and securing them together end to end, and wheels journaled at the outer ends of said second pair of tubular shafts.

8. In combination with a vehicle frame, a pair of shafts adapted to be associated with the said vehicle frame in a manner to permit free rotation of the shafts as a unit about their longitudinal axis, said vehicle frame having a transversely extending tubular bearing member receiving the said shafts, the longitudinal axis of said shafts being always perpendicular to the longitudinal axis of the vehicle frame and to the normal direction of travel of the said frame and perpendicular to the vertical axis of the said frame, means rigidly fixing said shafts together end to end to rotate as a unit extending across the width of said vehicle frame, a crank arm fixed to and extending radially from the opposite end of each shaft, said radial crank arms extending in opposite directions from the axis of said shafts and in the same plane, an axle fixed to and extending laterally from the end of each of said crank arms and parallel to said shaft axis, and wheels journaled on said axles and disposed at opposite sides of said vehicle frame, said wheels being always parallel to the longitudinal axis of the said vehicle frame and to the normal direction of travel of the said frame and parallel to the vertical axis of the said frame regardless of the angular position of the crank arms and shaft, said wheels and shaft structure constituting a support for the entire width of the vehicle frame, said shafts being tubular and said means fixing said tubular shafts together including tie bolt means disposed within said tubular shafts.

9. In apparatus according to claim 8, said vehicle frame having a second transversely extending tubular bearing member spaced from and parallel to said first mentioned tubular bearing member, a second pair of tubular shafts received within said second tubular bearing member, tie bolt means disposed within said second pair of tubular shafts and securing them together end to end within said second tubular bearing member, and wheels journaled at the outer ends of said second pair of tubular shafts.

10. In apparatus according to claim 8, said vehicle frame having a sceond transversely extending tubular bearing member spaced from and parallel to said first mentioned tubular bearing member, a second pair of tubular shafts received within said second tubular bearing member, tie bolt means disposed within said second pair of tubular shafts and securing them together end to end within said second tubular bearing member, and wheels journaled at the outer ends of said second pair of tubular shafts, and means carried on each of said second pair of shafts and engaging the said vehicle frame and preventing rotation of said second pair of shafts within said second tubular member.

WILLIAM FISCHER.

REFERENCES CITED

The following references are of record in the file of this patent:

UNITED STATES PATENTS

| Number | Name | Date |
|---|---|---|
| 326,284 | Forbes | Sept. 15, 1885 |
| 542,067 | Sellers et al. | July 2, 1895 |
| 657,494 | Marick | Sept. 4, 1900 |
| 842,804 | Murrel | Jan. 29, 1907 |
| 844,615 | Palmer | Feb. 19, 1907 |
| 1,149,153 | Schleicher | Aug. 3, 1915 |
| 1,290,813 | Weaver | Jan. 7, 1919 |
| 1,654,939 | Loebs | Jan. 3, 1928 |
| 1,732,825 | Wilson | Oct. 22, 1929 |
| 1,751,010 | Lindeman | Mar. 18, 1930 |
| 2,173,419 | Johnson | Sept. 19, 1939 |
| 2,227,762 | Ronning | Jan. 7, 1941 |
| 2,239,849 | Judd | Apr. 29, 1941 |

FOREIGN PATENTS

| Number | Country | Date |
|---|---|---|
| 12,186 | France | |
| 130,273 | Great Britain | July 31, 1919 |
| 623,054 | Germany | Dec. 12, 1935 |